B. H. SMITH.
PAPER BOX MANUFACTURING MACHINE.
APPLICATION FILED MAY 26, 1902.

1,006,885.

Patented Oct. 24, 1911
15 SHEETS—SHEET 4.

B. H. SMITH.
PAPER BOX MANUFACTURING MACHINE.
APPLICATION FILED MAY 26, 1902.
1,006,885.
Patented Oct. 24, 1911.
15 SHEETS—SHEET 5.
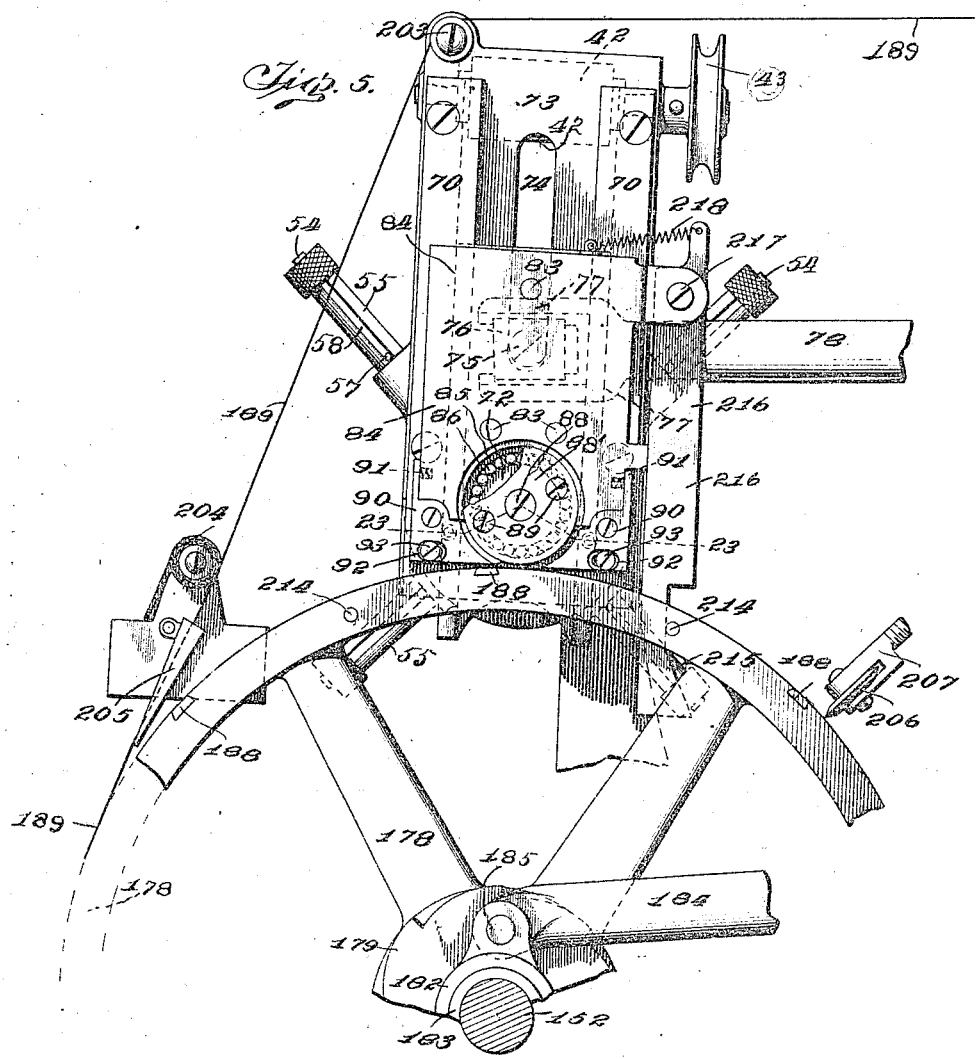
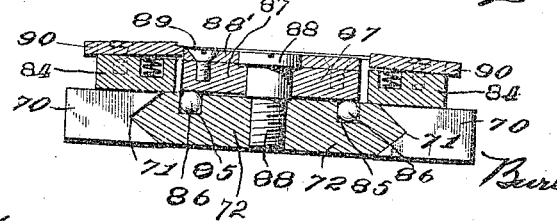

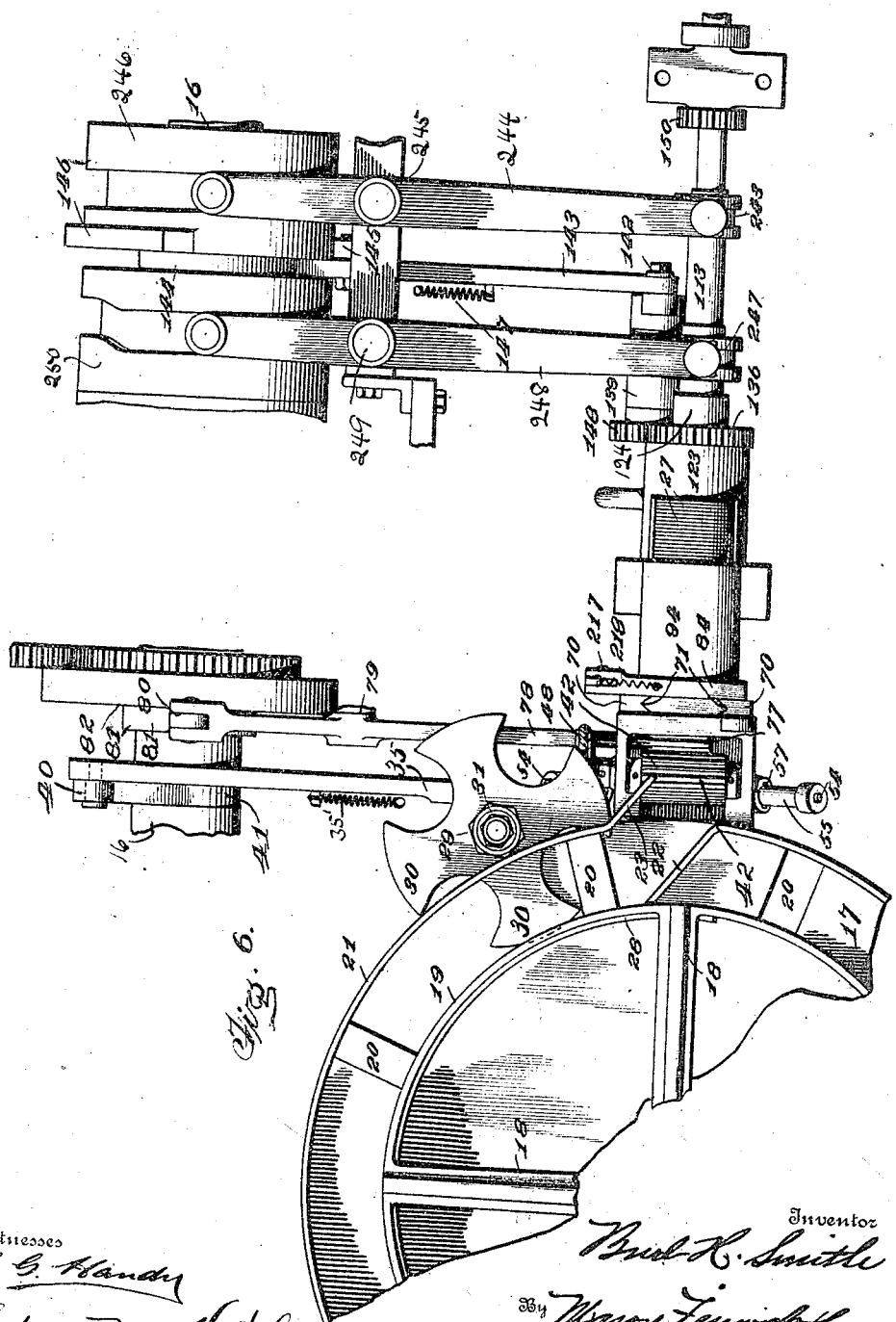

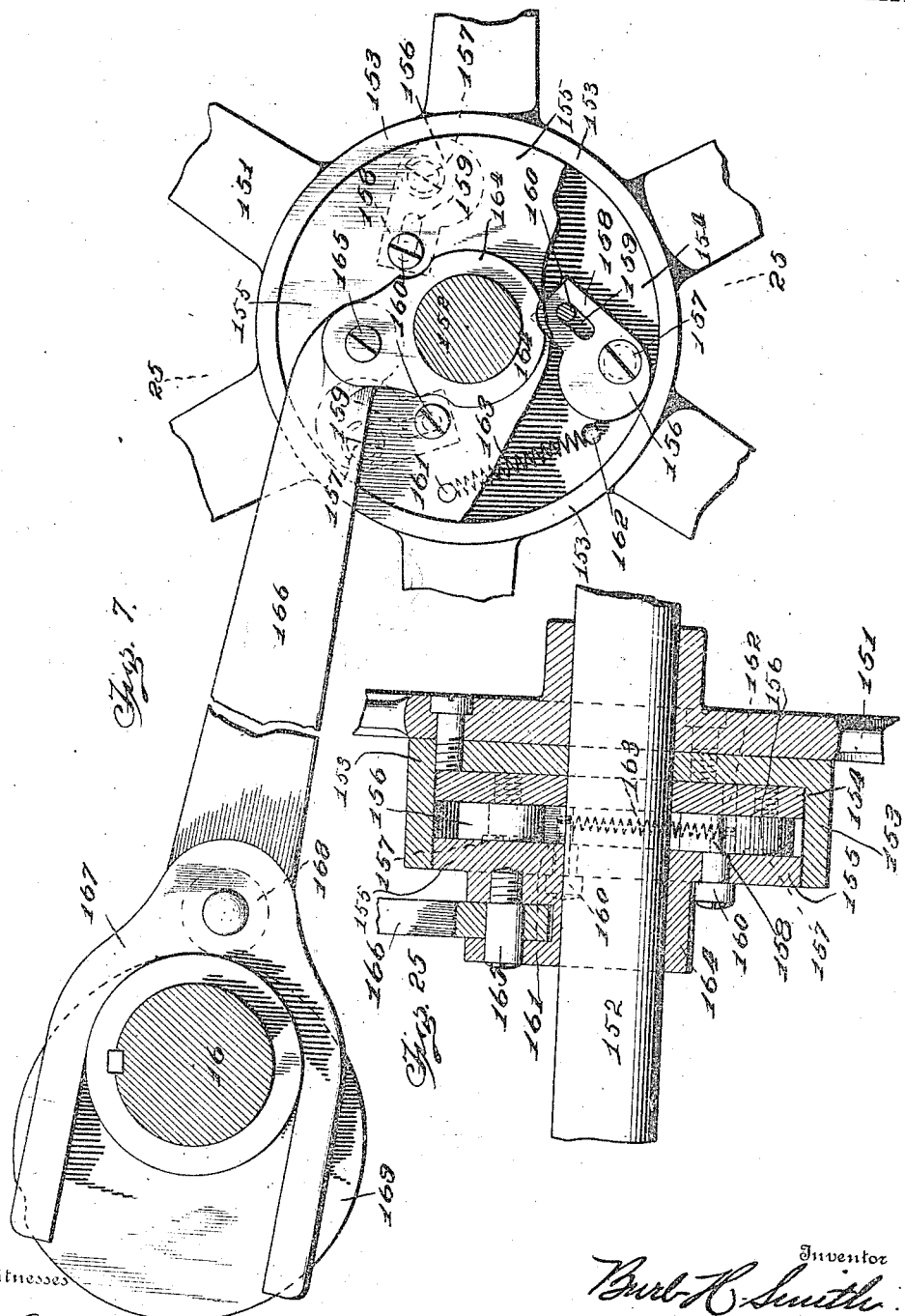

B. H. SMITH.
PAPER BOX MANUFACTURING MACHINE.
APPLICATION FILED MAY 26, 1902.

1,006,885.

Patented Oct. 24, 1911.
15 SHEETS—SHEET 8.

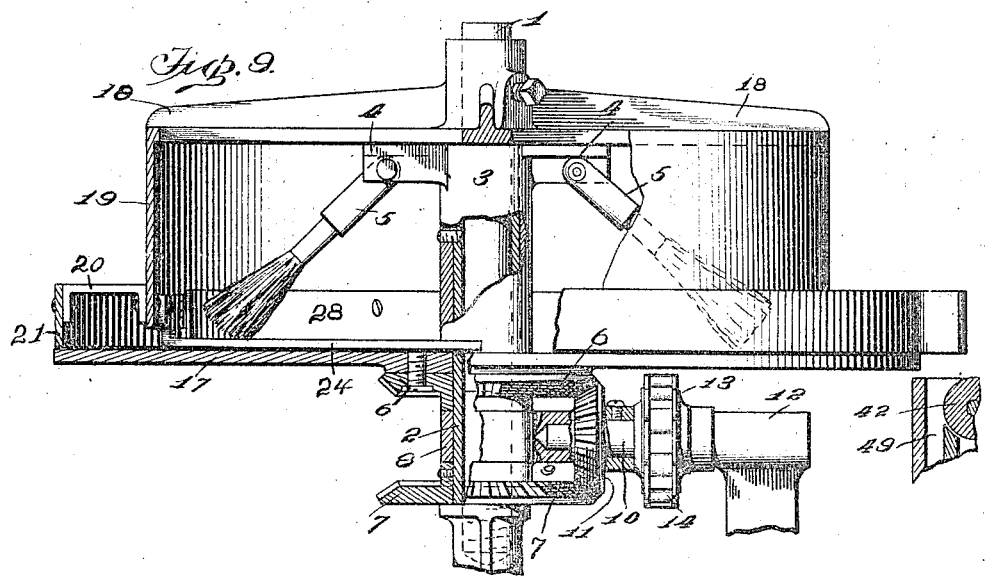

B. H. SMITH.
PAPER BOX MANUFACTURING MACHINE.
APPLICATION FILED MAY 26, 1902.
1,006,885.
Patented Oct. 24, 1911.
15 SHEETS—SHEET 10.
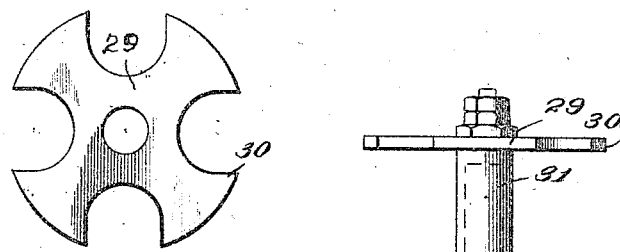
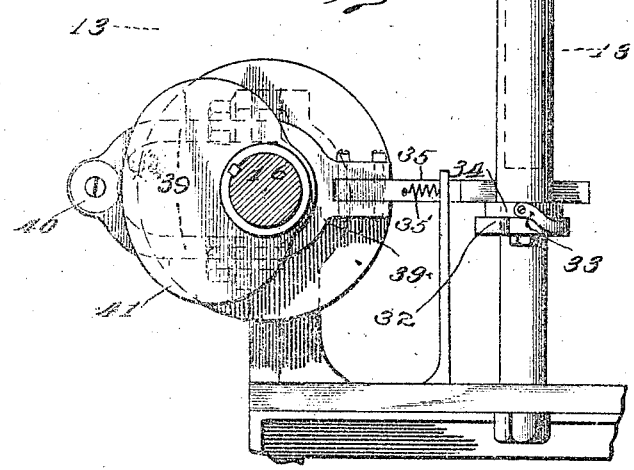
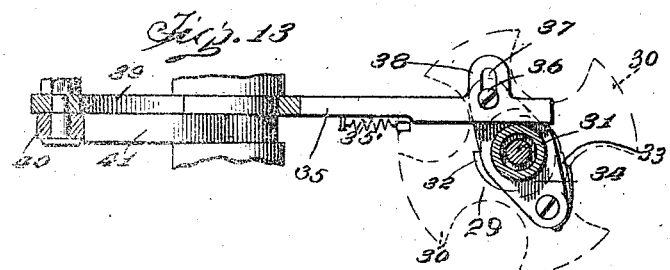

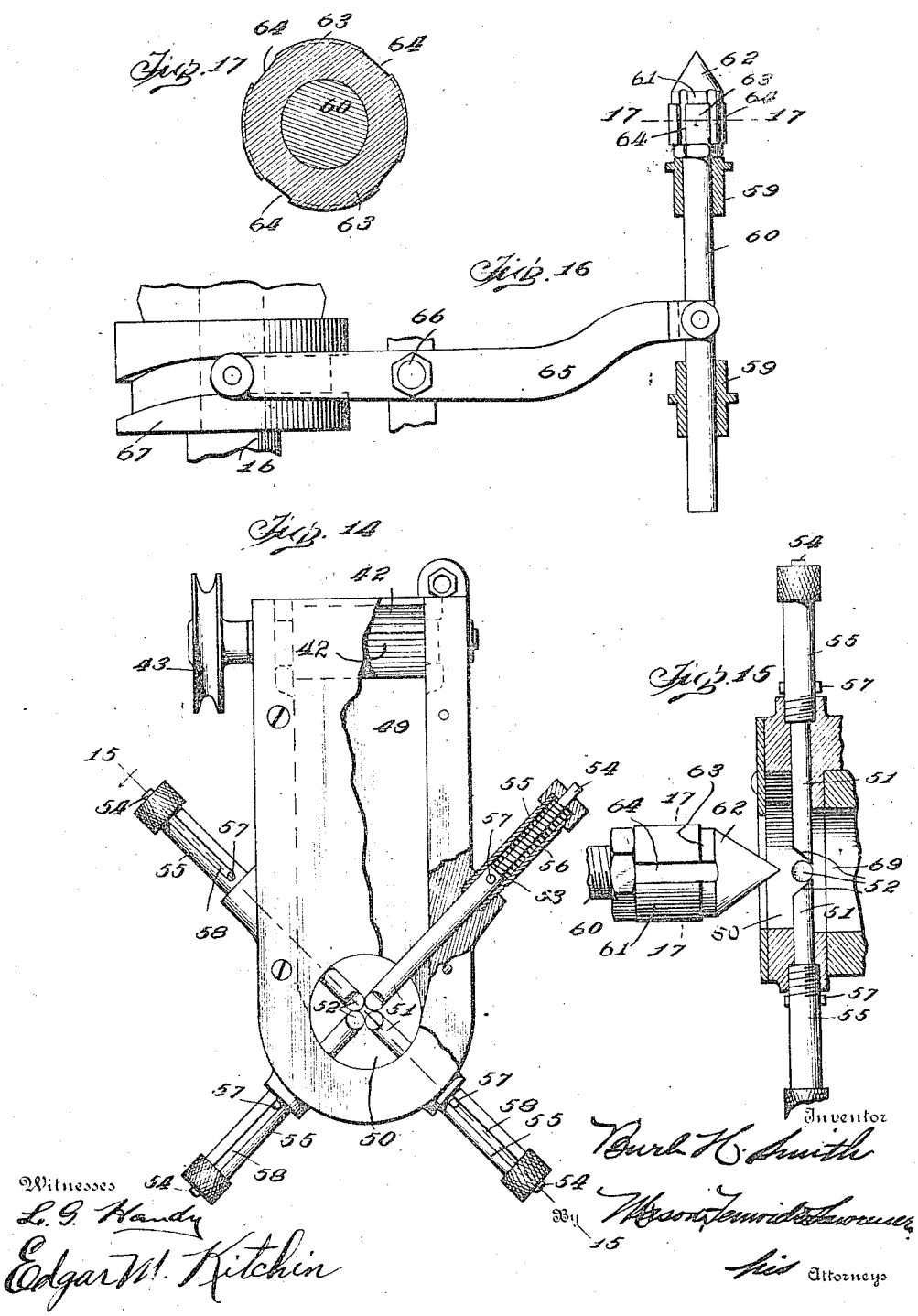

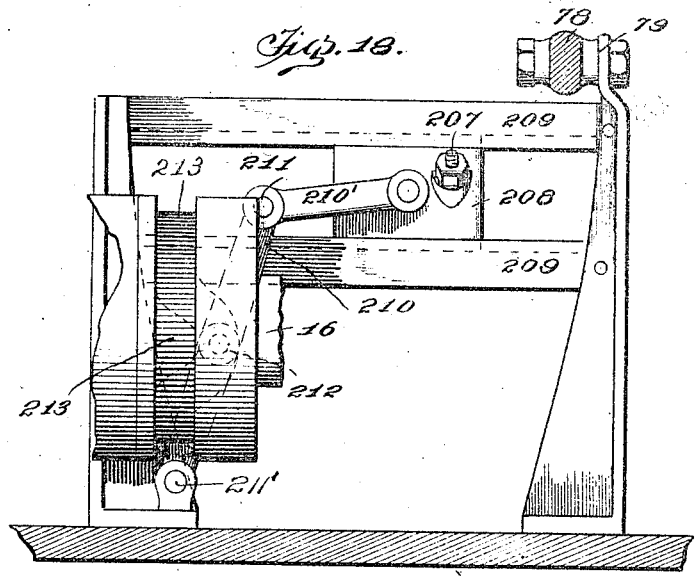
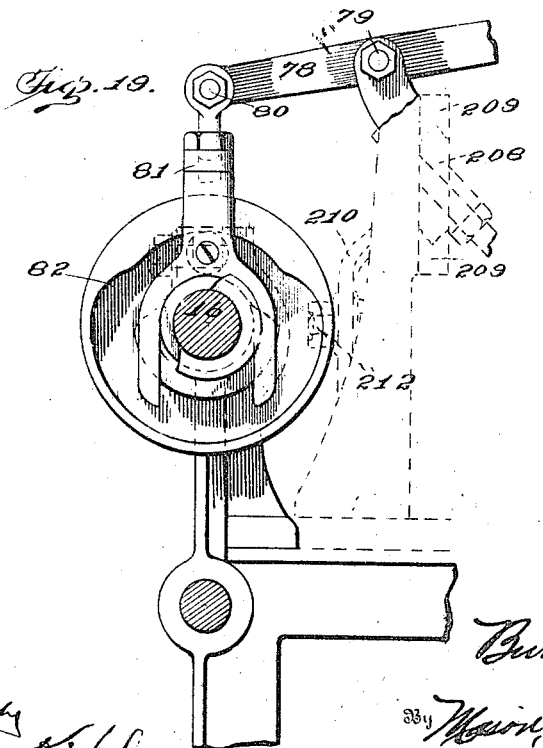

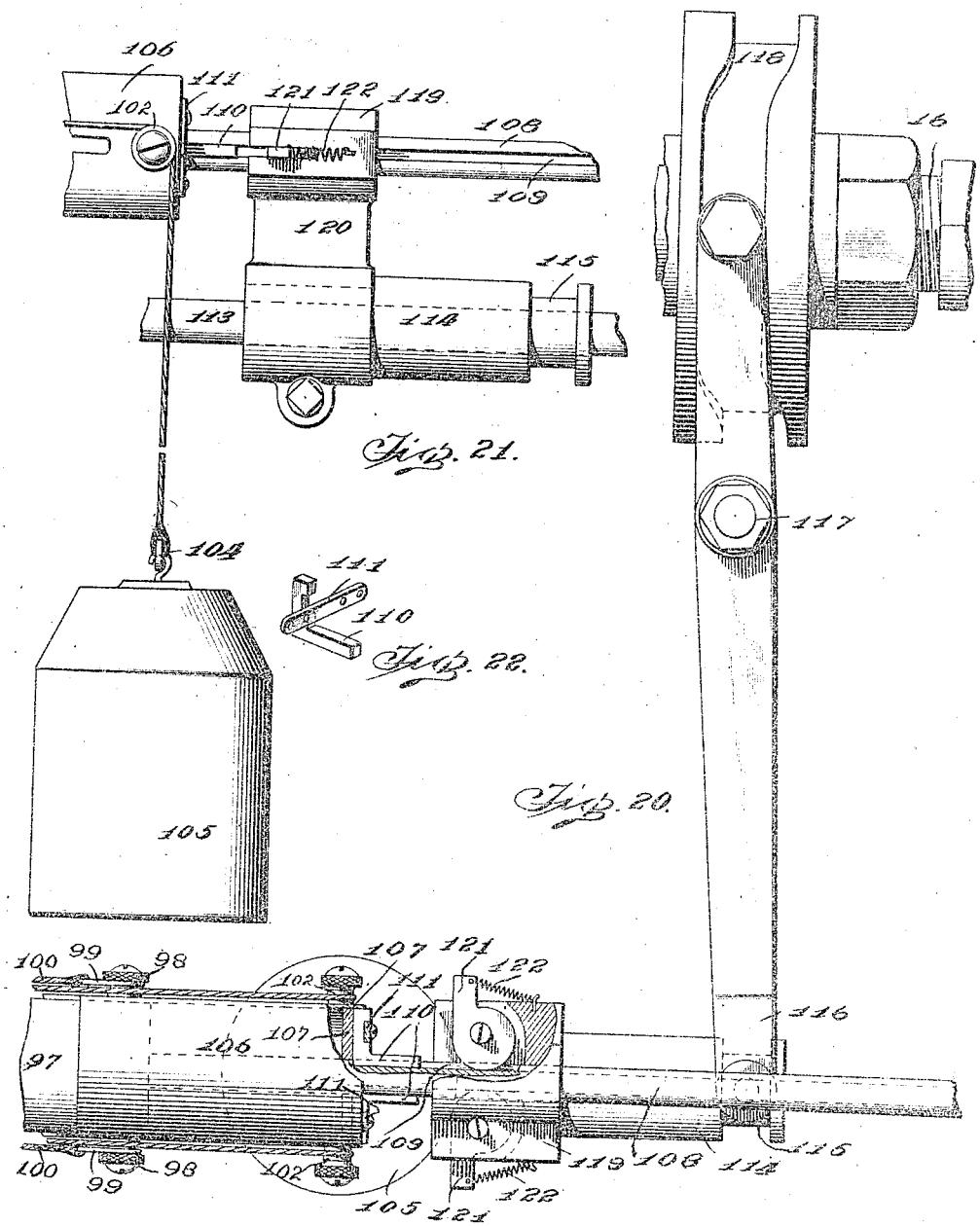

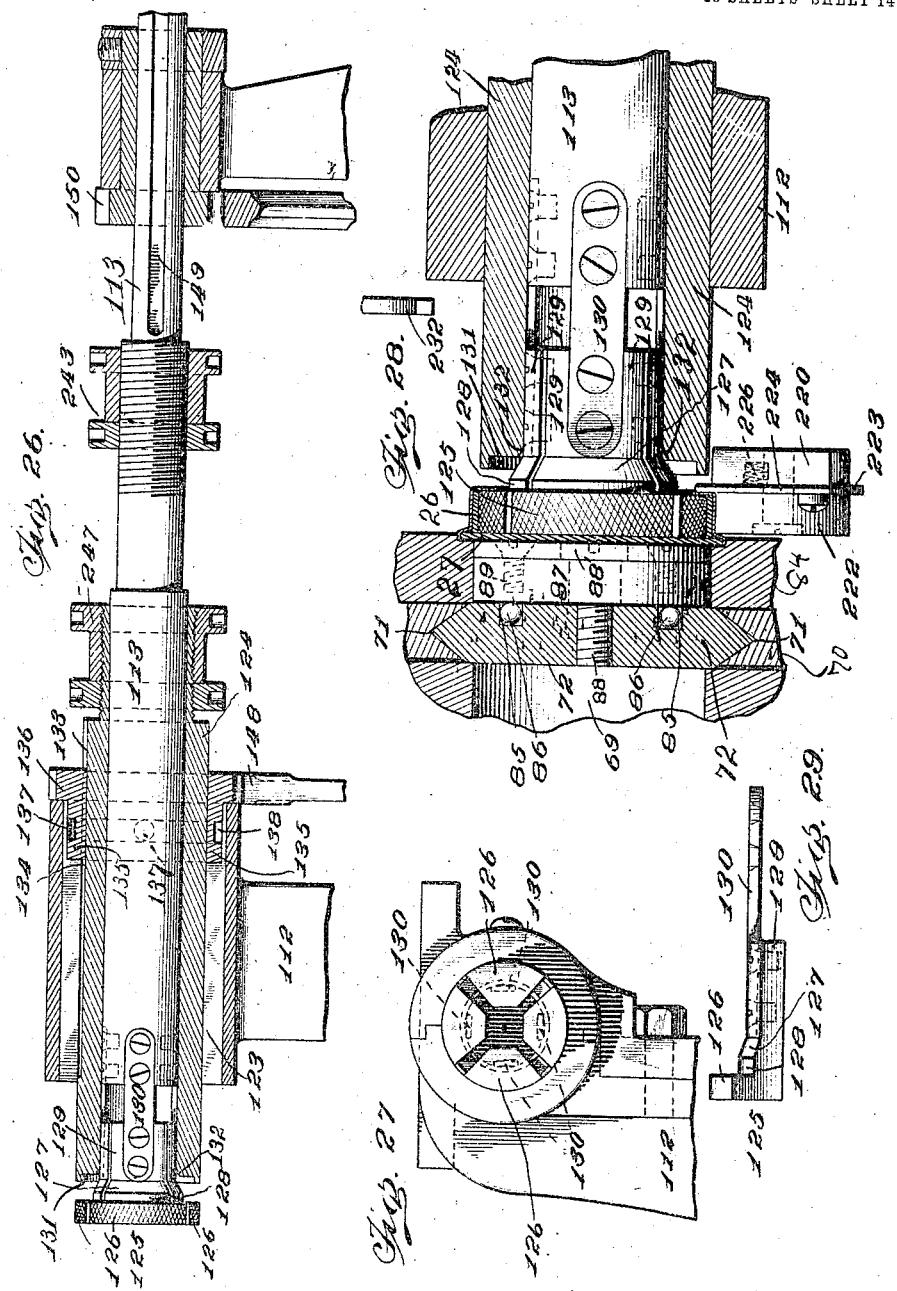

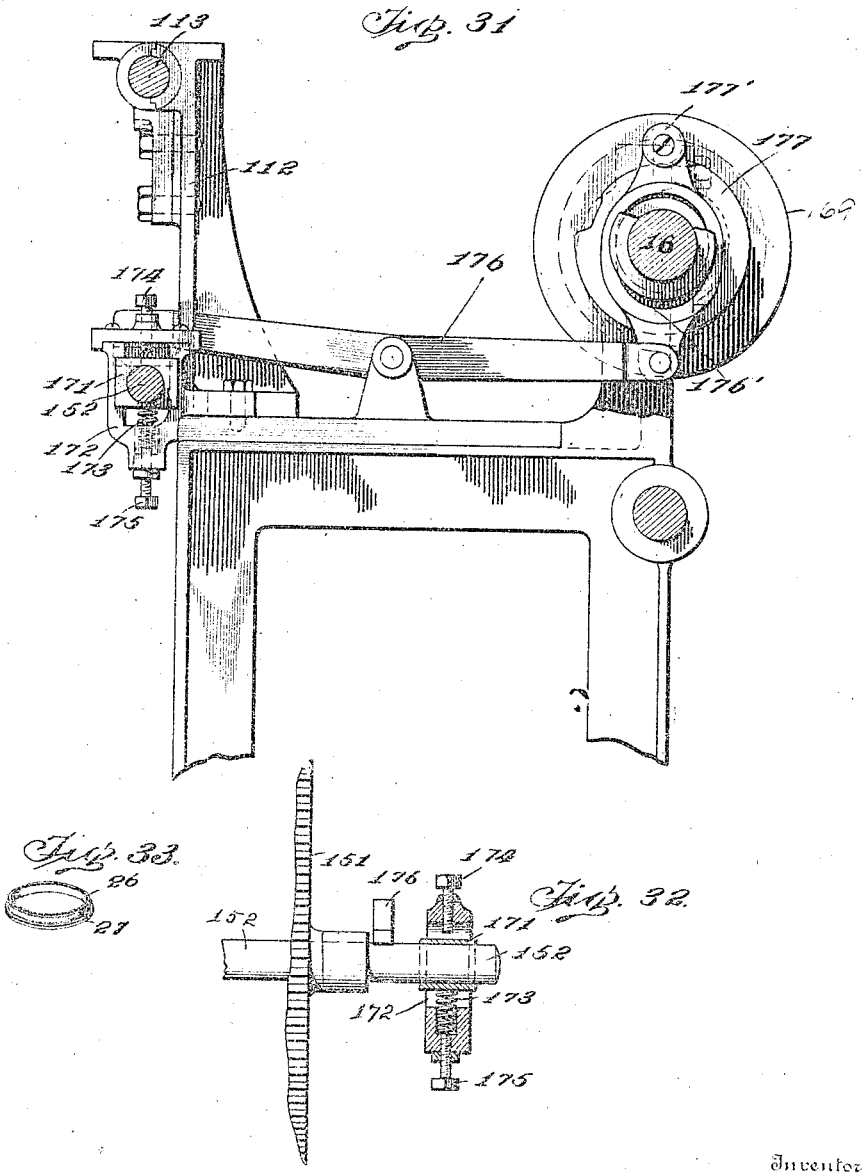

UNITED STATES PATENT OFFICE.

BURL H. SMITH, OF RICHMOND, VIRGINIA, ASSIGNOR TO THE RANDOLPH PAPER BOX COMPANY, OF RICHMOND, VIRGINIA, A CORPORATION OF VIRGINIA.

PAPER-BOX-MANUFACTURING MACHINE.

1,006,885.    Specification of Letters Patent.    Patented Oct. 24, 1911.

Application filed May 26, 1902. Serial No. 109,080.

*To all whom it may concern:*

Be it known that I, BURL H. SMITH, a citizen of the United States, residing at Richmond, in the county of Henrico and State of Virginia, have invented certain new and useful Improvements in Paper-Box-Manufacturing Machines; and I do hereby declare the following to be a full, clear, and exact description of the invention, such as will enable others skilled in the art to which it appertains to make and use the same.

This invention relates to paper box manufacturing machines, and particularly to such as are designed to assemble the parts of extension or French edge boxes.

The object in view is the production of mechanism, capable of easy control, for automatically assembling the various parts of a box and securing the same together.

With this and other objects in view the invention consists in combination with a suitable framework, of a hopper designed to contain rings representing the completed sides of a circular box, means for supplying a disk to each of said rings and means for applying a connecting medium for securing said rings and disks together.

It further consists in combination with a suitable framework, of means for supplying a ring and a disk at a given point each in timed relation to the other, and means for applying a connecting medium for securing said ring and disk together.

It still further consists in combination with a suitable framework, of means for supplying a ring and a disk at a given point each in timed relation to the other, and means for wrapping said parts with a tape for securing the same together.

It also consists in other novel constructions, combinations and arrangements of parts as will be hereinafter fully described and claimed.

Figure 1:
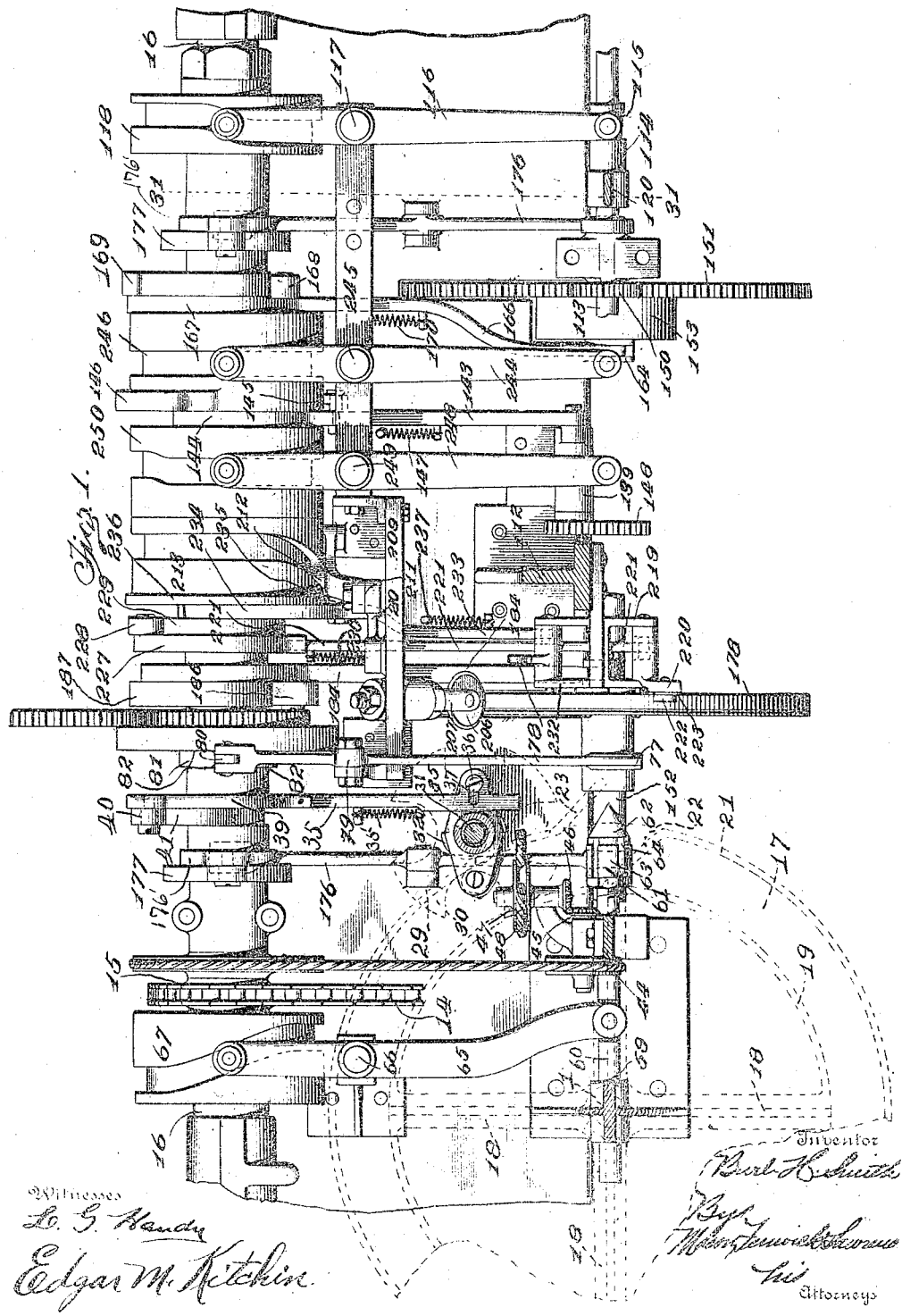
Figure 2:
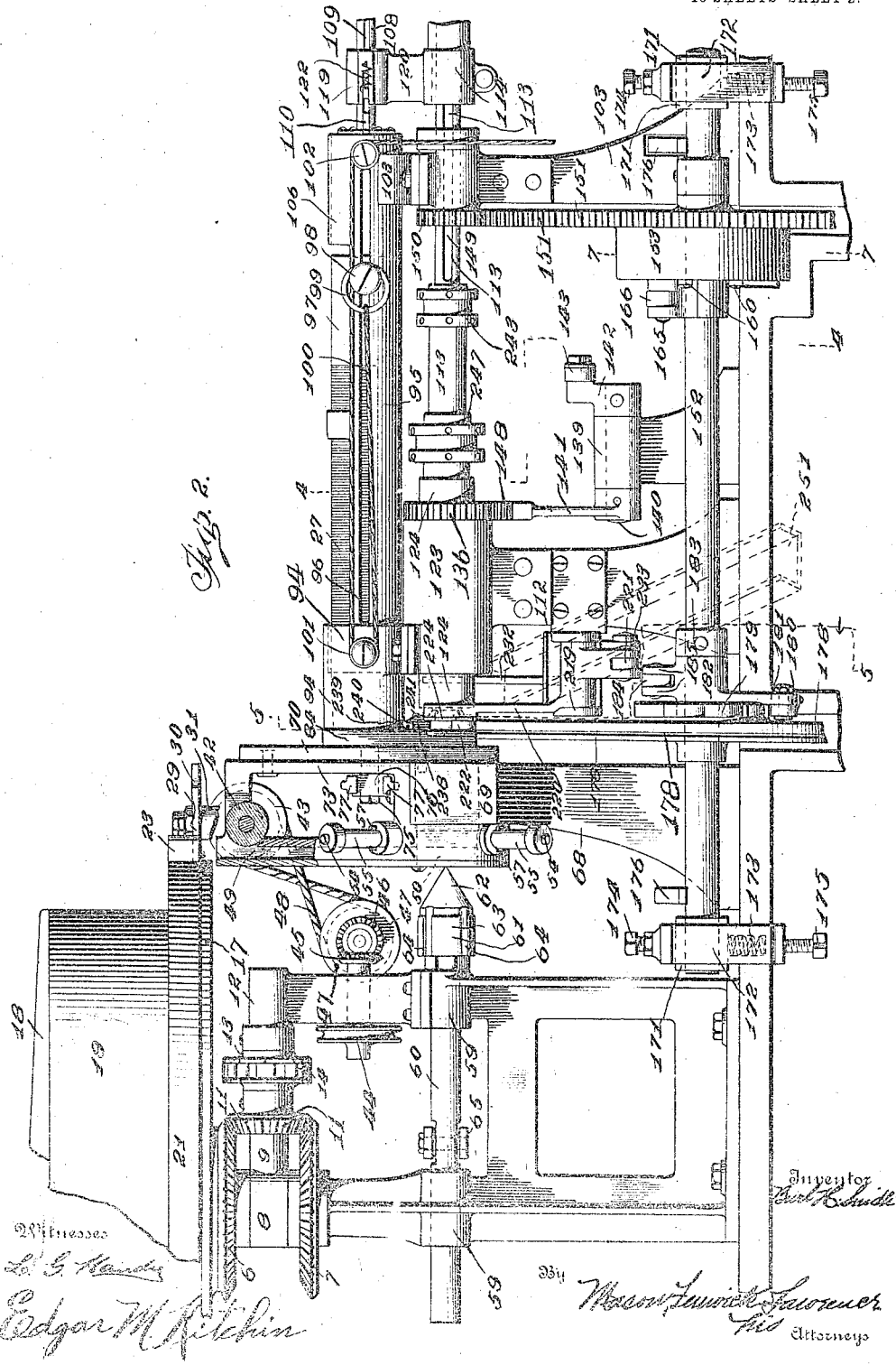
Figure 3:
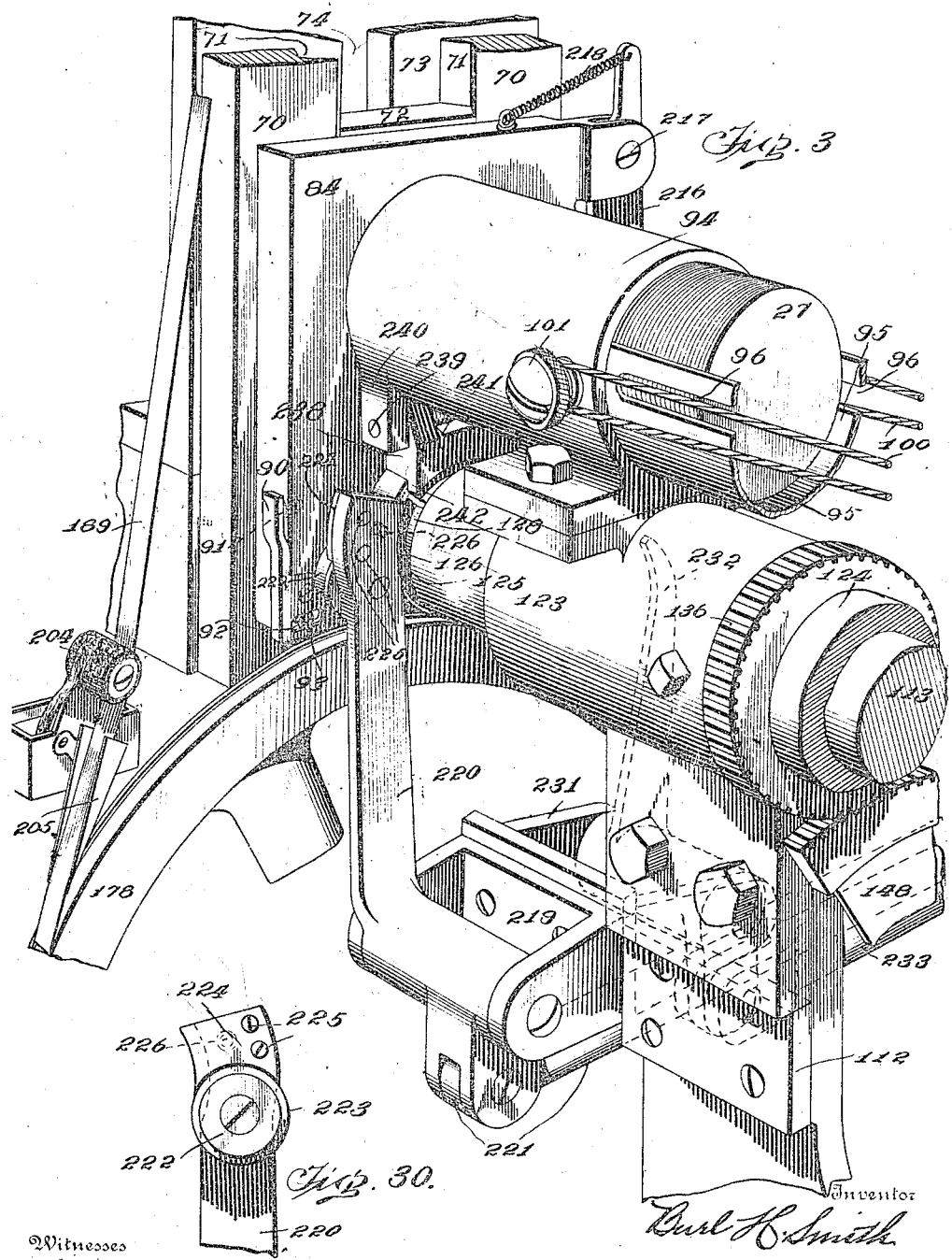
Figure 4:
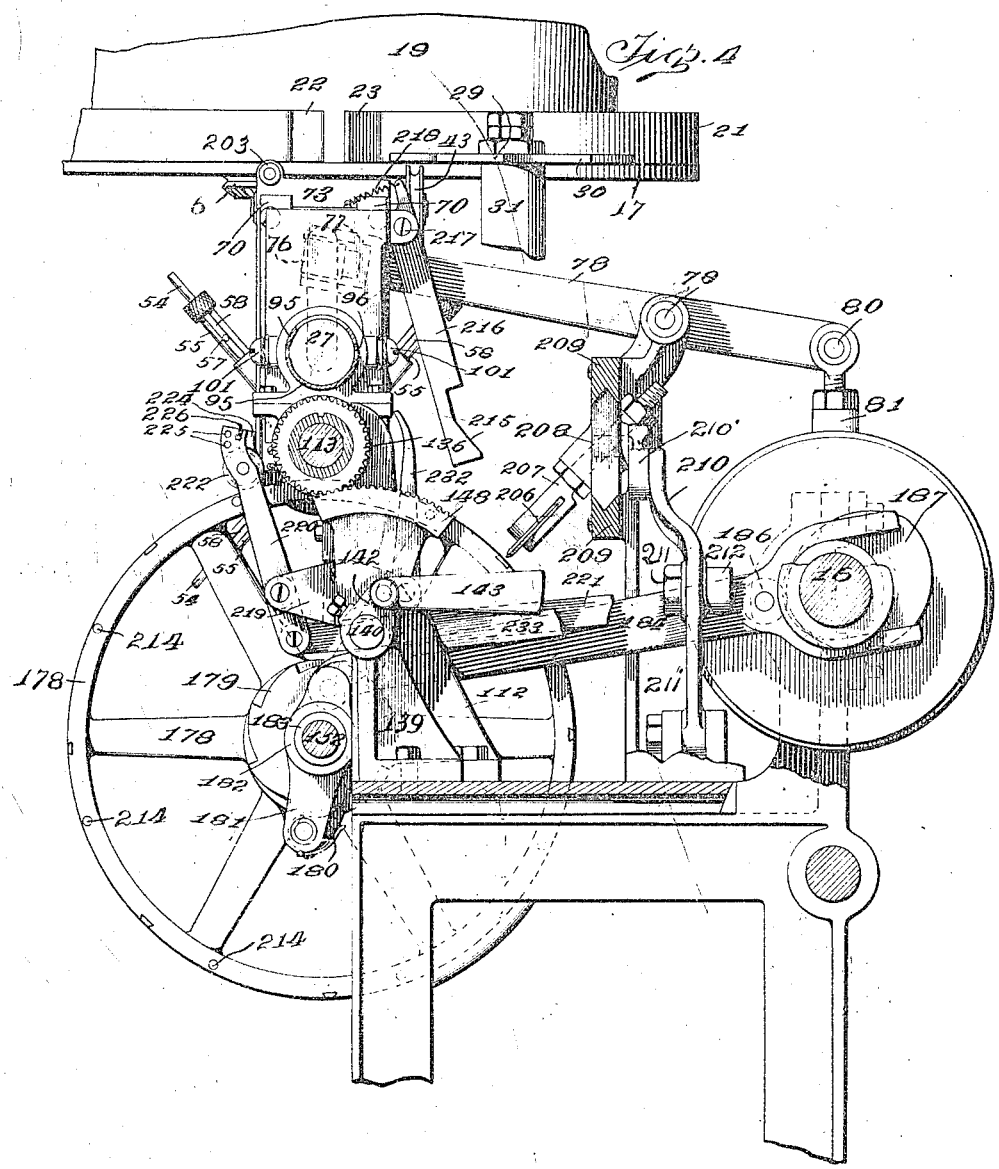
Figure 8:
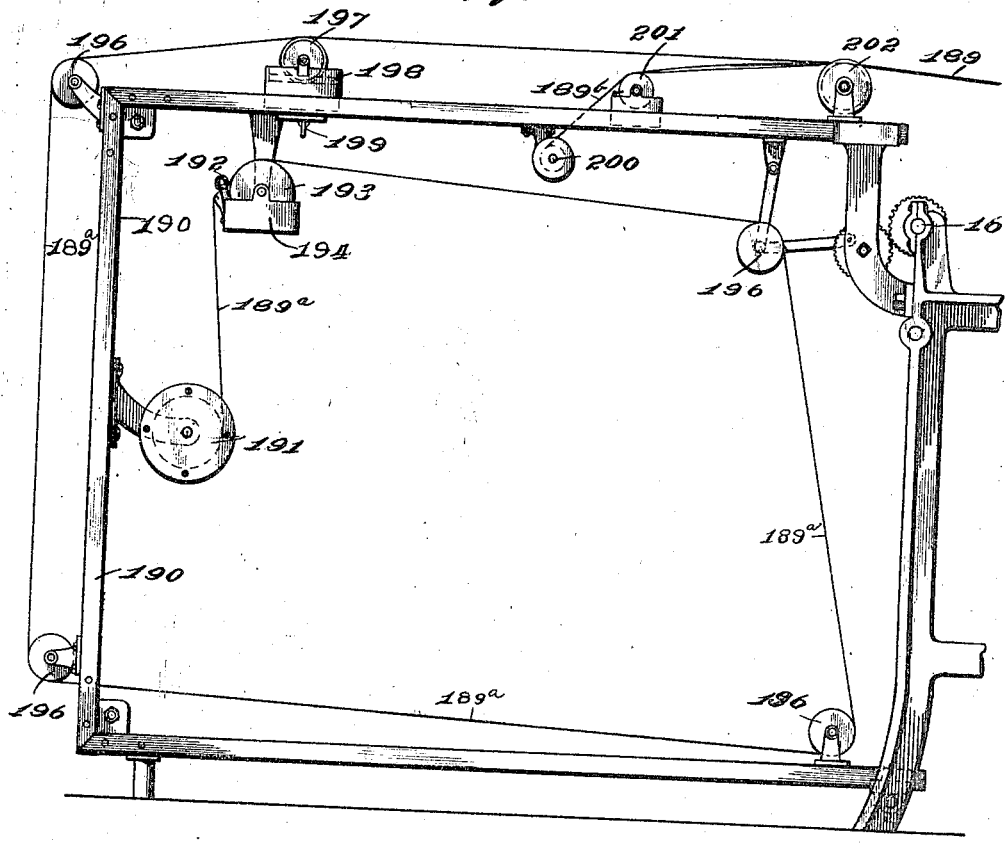
Figure 24:
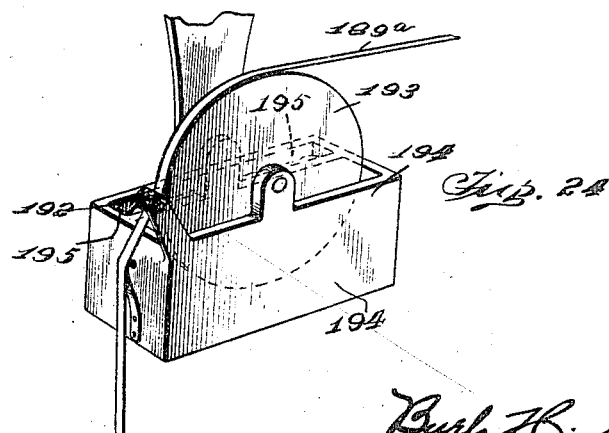

In the accompanying drawings: Figure 1 is a view of the machine in horizontal section, the section of that portion of the machine below the device for holding the rings being taken on the line 1—1 of Fig. 2, and of that portion below the disk supplying mechanism in a horizontal plane passing immediately beneath such mechanism. Fig. 2 is a view in side elevation of the same, omitting some of the parts. Fig. 3 represents an enlarged detail perspective view of that part of the mechanism in which the assembling of the parts of a box is accomplished. Fig. 4 represents a transverse section taken on line 4—4 of Fig. 2. Fig. 5 represents a transverse section taken on the plane of line 5—5 of Fig. 2. Fig. 6 represents a partial top plan view of the ring feed mechanism and surrounding parts. Fig. 7 represents a transverse vertical section taken on line 7—7 of Fig. 2, parts being broken away. Fig. 8 represents a view in side elevation of the tape carrying frame. Fig. 9 represents a view in side elevation of the ring supply hopper. Fig. 10 represents a top plan view of the same. Fig. 11 represents a top plan view of the ring feeding wheel. Fig. 12 represents a view in side elevation of the same showing its supporting standard and operating mechanism. Fig. 13 represents the same in horizontal section on line 13—13 of Fig. 12. Fig. 14 represents a detail view in side elevation of the ring chute, parts being broken away for illustrating the interior structure. Fig. 15 represents a transverse section on line 15—15 of Fig. 14, the ring advancing plunger being shown in elevation. Fig. 16 represents a detail top plan view of the ring advancing plunger together with its operating mechanism. Fig. 17 represents a transverse section on line 17—17 of Fig. 16. Fig. 18 represents an enlarged fragmentary view of the scoring disk operating mechanism. Fig. 19 represents a transverse section through the same. Fig. 20 represents a detail top plan view of the disk plunger releasing mechanism. Fig. 21 represents a view in side elevation of the same, the operating cam being omitted. Fig. 22 represents a detail perspective view of one of the angular fingers of the disk plunger housing. Fig. 23 represents an enlarged detail transverse section taken on the plane of line 23—23 of Fig. 5. Fig. 24 represents an enlarged detail perspective view of one of the tape moistening mechanisms. Fig. 25 represents a transverse section taken on line 25—25 of Fig. 7. Fig. 26 represents a longitudinal vertical section taken through the expanding former sleeve, showing the former in side elevation. Fig. 27 represents a view in end elevation of the same. Fig. 28 represents a fragmentary horizontal section through the disk carrying slide and the expanding former sleeve, a portion of the former being shown in top plan. Fig. 29 represents an enlarged detail view of one of the sections of the expanding former. Fig. 30 represents an enlarged detail side elevation of the tape applying wheel and rubber. Fig. 31 represents a transverse vertical section taken on the plane of line 31—31 of Fig. 1. Fig. 32 represents a detail section illustrating the spring mount of one of the journals of the tape carrying wheel shaft. Fig. 33 represents a detail perspective view of a completed box section as formed by the present improved mechanism.

In the production of circular boxes with extension or French edges it is found necessary to form the two main sections of the box exactly similar and then secure within one of the sections a suitable collar projecting beyond the circular wall of the same designed to removably receive and be inclosed by the wall of the other section. These boxes are very common and extensively used in the pharmaceutical trade, so that further description of the same would hardly seem necessary, but it will be observed here that the present mechanism is not designed for the production of one of these boxes complete, but only for the production of the completed section, that is to say that part of the box which is designed to receive the collar, or to fit over the collar. In order to produce these sections of circular boxes I employ certain mechanical elements necessary for the assembling of the parts of the sections, as will be seen by reference to the accompanying drawings in which I have shown a complete embodiment of the present invention.

In carrying out the invention I employ any suitable framework for supporting the moving parts and retaining in position the stationary parts.

Referring to the drawings by numerals 1 indicates a suitable stationary vertically arranged standard surrounded by a rotatably mounted sleeve 2, to which is fixed a second sleeve as 3, provided with laterally extending arms 4, 4, carrying brushes 5, 5, best seen in Figs. 9 and 10. A preferably beveled gear wheel as 6, surrounds sleeve 2, beneath sleeve 3, and spaced beneath the wheel 6, is a similar wheel 7. Between the wheels 6 and 7 and surrounding the sleeve 2, is a collar 8, provided with a suitable laterally extending lug 9 forming a bearing for the journal of a shaft 10, said shaft being provided with a beveled gear 11, meshing with both of gear wheels 6 and 7. The outer end of shaft 10 is preferably journaled in any suitable support 12 and carries a sprocket wheel as 13 between said support and gear 11. The sprocket wheel 13 is designed to receive motion through a suitable chain 14 passed about a sprocket 15 carried by the main operating shaft 16. Carried by the wheel 6 is a circular plate 17, the gear wheel 7 being fixed to sleeve 2 so that rotation of gear 11 will swing the brushes 5 about in one direction and rotate the plate 17 in the other.

Secured near the upper end of standard 1 is a suitable spider 18 carrying an annular brush inclosing housing 19, said housing being provided with radially extending brackets 20, supporting an outer ring 21, which ring is preferably of the same diameter as the plate 17. The ring 21 is preferably broken at one point and one end is bent inwardly as at 22, and the other outwardly as at 23, leaving a space therebetween approximately the same as that between housing 19 and the said ring 21. Suitable tangentially arranged arms as 24, 24, are secured to the lower edge of the housing 19 and are preferably beveled as at 25, in the direction of movement of the plate 17.

Each of the sections to be formed by the present improved mechanism, is as above suggested, made up of a ring, as 26, a disk 27, and means for securing the parts together as will be best seen by reference to Fig. 33. The housing 19 is designed to receive a supply of rings 26, said housing having its lower edge spaced above plate 17 a distance equivalent to the width of one of said rings, and said housing also being spaced from the ring 21 a distance equal to the diameter of ring 26, said ring 21 having its lower edge contiguous plate 17. An approximately semi-circular plate as 28 is preferably secured to the lower edge of the housing 19 with one end near end 22 of ring 21 and the said plate extending from this point in an opposite direction to the direction of movement of the plate 17, whereby the rings 26 within housing 19 may be discharged therefrom beneath the edge thereof for approximately one half the circumference of the said housing, the said housing remaining stationary while the contiguous parts are moving, whereby said rings 26 are caused to be fed out of the space between ends 22 and 23 of ring 21. In order to control the feed of said rings and time their discharge, a suitable feed wheel as 29 is interposed in the path of movement of said rings. The wheel 29 is formed with a plurality of radial arms 30 having their edges curved for receiving a ring 26 between each two of the same, each arm 30 being of a length to extend from ring 21 to housing 19, whereby the rings 26 may only be fed out between the ends 22 and 23 of ring 21 in timed relation to the movement of wheel 29.

In order to rotate the wheel 29 timed to the operation of other parts of the present mechanism as best seen in Figs. 11, 12 and 13 of the drawings I preferably secure the same to a vertical shaft 31, provided with a ratchet wheel 32 designed to be engaged by a suitable pawl 33, spring pressed and carried by a block 34, surrounding said shaft 31, said block being pivotally attached to a pitman 35, by means of any suitable screw or bolt 36 passed through a slot 37 formed in a laterally projecting lug 38 carried by the said pitman 35. The pitman 35 is connected with a strap 39 inclosing shaft 16 and provided with a wheel 40 traveling upon the periphery of the cam 41 carried by said shaft 16. A spring 35' is secured to pitman 35 and retains wheel 40 in contact with cam 41. By means of this mechanism a reciprocating movement is imparted to pitman 35 and the block 34 is rocked back and forth, each forward movement throwing forward the shaft 31 a distance sufficient to rotate wheel 29 the necessary distance to discharge one of the rings 26. As the rings 26 are discharged by the rotation of wheel 29, they fall into contact with a roller 42, journaled beneath the horizontal plane of plate 17, and having one of its journals provided with a power pulley 43, receiving power from shaft 16 through any suitable belt or cable mechanism designed to rotate a pulley 44, mounted upon a shaft carrying a beveled gear 45, meshing with a similar gear 46, which latter gear carries a pulley 47 about which is passed a belt or cable 48, said cable being also passed about the pulley 43. By this chain of mechanism rotary motion of shaft 16 from one plane is transferred to a plane at right angles. The roller 42 may have a smooth surface, as seen in Figs. 2 and 9, or may be provided with corrugations or otherwise suitably roughened, as seen in Figs. 6 and 14, for increasing its gripping capacity. A chute as 49 particularly disclosed in Fig. 14 leads downwardly on that side of roller 42 nearest the periphery of plate 17, whereby the ring 16 striking said roller 42 will be directed down said chute 49. At the lower end of chute 49, the housing forming said chute is transversely apertured, as at 50 said aperture preferably being of the size and shape for snugly receiving and permitting the passage laterally of one of the rings 26.

A plurality of longitudinally slidable radial arms 51, 51 best seen in Figs. 14 and 15, extend into the aperture 50, and have their contacting ends beveled rearwardly, as at 52. The outer ends of the arms 51 are shouldered, as at 53, and provided with stems 54, extending through inclosing housings 55, a spring as 56 encircling each stem 54 and having one end pressing against the outer end of the housing 55 and the other end against the shoulder 53, whereby said arms are normally held with their inner ends in contact with each other centrally of the aperture 52. Each of the arms 51 is preferably formed with a laterally projecting lug 57 designed to move in a slot 58 in its respective housing for guiding the said arm. Mounted in suitable supports 59 is a slidably arranged shaft as 60 seen in Figs. 15, 16, and 17, extending in the horizontal plane of aperture 50 and carrying on its inner end a plunger 61, tapered to conical form as at 62, and provided with an annular shoulder 63 broken by longitudinal grooves 64, 64, equal in number to the number of arms 51 and extending in the same planes therewith. Pivotally connected with shaft 60 intermediate its mountings is an operating lever 65, pivoted as at 66, intermediate its length and having its free end engaging a cam 67 carried by the main shaft 16, the said cam being of a shape for swinging said lever in such manner as to throw forwardly the plunger 61 relative to the movement of the other parts of the mechanism. The support 68 for the housing of the chute 49 is provided with a cylindrical bore 69, registering with aperture 50, and extending to the opposite side of said support to that upon which the said housing is secured.

The movement of lever 65 effected by cam 67 is timed to the operation of wheel 29 so that each time a ring 26 is lodged within aperture 50, the plunger 61 will move forwardly, the cone 62 will spread the arms 51, causing the ring to lie flush with the shoulder 63, and the said arms to jump said ring and extend into the grooves 64. The cam 67 next causes the plunger 61 to retrace its movement whereby the said ring will be left within bore 69 by reason of the fact that the rear portion of the ends of arms 51 will engage the same and prevent its return with the plunger. The bore 69 may be of any length desired according to the width of the support 68 and in operation is preferably kept filled with the rings 26.

Rising vertically from the opposite side of support 68 to chute 49 are suitable standards 70, 70, as particularly disclosed in Figs. 3 and 5 of the drawings formed with longitudinal grooves 71, 71, designed to form ways for a slide 72, arranged to move therebetween longitudinally of the said standard. Secured to the rear of standard 70 is a back plate 73, slotted longitudinally, as at 74, for permitting the passage of a pin or bolt 75 carried by a block 76, slidable longitudinally within a yoke 77, formed upon the end of an operating lever 78, said lever being pivoted intermediate its length, as at 79, and pivotally connected, as at 80, to a suitable strap 81, engaging a cam 82, carried by the main power shaft 16. The pin 75, after passing through slot 74, engages the slide 72 whereby movement of the lever 78 is designed to move said slide in its ways.

Secured by any suitable attaching means 83, 83, to the front face of slide 72, as seen in Figs. 5 and 23 is a face plate 84, of greater width than the width of the slide so as to extend beyond the inner edges of the standard 70 and adapted to move in contact therewith with the movement of the slide. The lower end of the slide 72 is formed with an annular ball race 85, adapted to receive suitable anti-friction balls or rollers 86 against the outer edge of which is held a disk 87, retained rotatably in position by means of a screw 88, passed through said disk and into slide 72. The outer face of disk 87 carries a circular plate 88', secured to said disk by means of screws 89, as seen in Figs. 5, 23 and 28. The disk 87 and disk 27 of the box are rotated during the operation of applying the tape, the clamping action of fingers 90 described below not being sufficient to prevent this rotation. The plate 84 is of course formed with an annular aperture for permitting the arrangement of disk 87, said plate extending a distance outside the vertical plane of plate 88' equal to the thickness of one of disks 27, said disk 87 and plate 88' being of the same diameter. Pivoted to plate 84 upon each side thereof is a finger 90, each being pressed by a suitable spring 91, and guided by slots 92, engaged by pins 93, passed into plate 84. The inner edges of fingers 90 are struck on an arc of a circle and are designed normally to register with the circular aperture in plate 84.

Referring to Fig. 23 it will be observed that the finger 90 shown at the left is provided with an offset portion for the accommodation of the disk, and for carrying the tape to the rear of the disk when such tape is applied to the assembled box members as hereinafter described.

In front of plate 84 as best disclosed in Figs. 2 and 3 is arranged a cylinder 94, extending in a horizontal plane and having its rear end positioned to register with the circular aperture in the said plate 84 when the slide 72 is at the highest point of its movement. Extending forwardly from cylinder 94 is a semi-circular trough 95, slotted on each side longitudinally, as at 96, 96, and designed to contain a supply of disks 27, a plunger 97, normally pressing the said supply of disks into said cylinder 94. The plunger 97 is provided with laterally extending lugs 98, moving in slots 96, each being engaged by a ring 99, carried by a suitable cable 100, passed about any suitable pulley 101 secured onto the side of cylinder 94 and forwardly and about a similar pulley 102 carried by the front end of trough 95, the said front end of the trough being supported in position by a suitable standard 103, of the main framework. The said cables have their forward ends passed downwardly and secured together by link 104, to which link is attached a comparatively heavy weight 105, whereby, as above suggested the plunger 97 is caused to normally press the supply of disks 27 toward the cylinder 94, but at certain times during the operation of the present improved mechanism, as will hereinafter appear it becomes necessary that the pressure upon said disks be released. With this object in view the front end of trough 95 is provided with a cylindrical portion 106 closed at its front end by a suitable head 107, centrally through which is passed a shaft 108 having its rear end attached to the front end of the plunger 97, said shaft being provided with a plurality of longitudinal grooves 109. A plurality of angular fingers 110, seen best in Figs. 20 and 22 are carried by the head 107 and secured thereto by transverse straps 111, the horizontal portions of said fingers 110 lying within the grooves 109.

Spaced below shaft 108 and supported in standard 103, at its front end and by standard 112 near its rear end is a shaft 113, the front end of said shaft carrying a sleeve 114 formed at its front end with an annular groove 115, designed to be engaged by the arms of the bifurcated end of the lever 116, pivoted, as at 117, and engaging a cam 118, at its free end, said cam being carried by the main power shaft 16. The contour of the groove in cam 118 is such as to swing the bifurcated end of lever 116 forwardly in timed relation to the movement of slide 72. A sleeve 119, slidably surrounds shaft 108, outside the head 107 and is connected by a web 120 with sleeve 114. The sleeve 119 is provided with a plurality of pivotally mounted cams 121, pressed by springs 122, at their outer ends in an opposite direction to that of the movement of plunger 97, the inner ends of said cams engaging the grooves 109, and being held in contact therewith by said spring. The inner ends of cams 121 are of approximately circular form, said cams being pivoted off center, whereby movement of sleeve 119 in the direction of movement of plunger 97 will cause the said inner ends of the cams 121 to rotate in an opposite direction to the pull of springs 122, whereby the shaft 108 will be released and the plunger 97 affected by weight 105. It will be observed that as rotation of the inner end of cams 121 in an opposite direction to the pull of springs 122 will release shaft 108, rotation in the opposite direction of the said inner ends of the cam will cause their positive clamping of plunger 108. In the operation of the device, the bifurcated end of lever 116 is swung forwardly at the appropriate time to effect such clamping of the cams 121, whereby the shaft 108 is moved longitudinally forwardly sufficiently to release the pressure of plunger 97 upon the supply of disks 27 in trough 95.

The standard 112 forming the rear support of shaft 113 is provided at its upper end, as seen in Fig. 3 with a housing 123 inclosing a sleeve 124 surrounding the rear end of shaft 113. The cylinder 94 is preferably secured to the housing 123 as a means of support.

To the rear end of shaft 113 as disclosed best in Figs. 26, 27, 28 and 29 is secured the mechanism generally mentioned as the expanding former and made up of four plates 125, each formed with a circular portion, 126, covering one quarter of a circle, whereby the four sections when brought together form a circular head, each of said plates being formed in front of its portion 126 with a bevel 127 leading upwardly to a circular portion 128, extending to the shoulder formed by portion 126. The bevel 127 extends downwardly to the forwardly extending arm 129 designed to carry a comparatively strong spring 130, which spring in operation has its free end secured to the rear end of shaft 113, said spring being so formed as to exert an outward pressure upon its respective plate 125. As before mentioned the shaft 113 is surrounded by sleeve 124 which is slidable thereon, and the rear end of which surrounds the arms 129 of the expanding former. The said rear end of sleeve 124 is provided with an annular shoulder 131, of a width equal to that of the shoulder formed by the portions 126, the inner edge of said shoulder 131, being beveled, as at 132, for purposes hereinafter mentioned. Sleeve 124 is of a diameter equal to that of the inner surface of ring 26. The sleeve 124 is grooved longitudinally, as at 133, for receiving a key 134 carried by a collar 135, which collar is formed with a toothed flange 136 extending outside the housing 123. A lug 137 is carried by housing 123 and extends into an annular groove 138 formed in sleeve 124 whereby the same is free to rotate but is held against longitudinal movement. A suitable bracket 139 extends vertically upward from the main frame, is bored transversely, and carries a rock shaft 140, to one end of which is secured an arm 141, and to the other end a crank 142. To the free end of the crank 142 is pivotally attached a pitman 143, extending to the main shaft 16 and provided with a yoke 144 surrounding the same and a traveler 145, engaging a cam 146 carried by said shaft 16, said cam throwing forward the pitman 143 and any suitable means as a spring 147 being employed for retracting said pitman as soon as permitted by said cam 146. The upper end of arm 141 is provided with a segmental rack 148, meshing with the teeth upon the flange 136, whereby the sleeve 124 will be oscillated by the movement of pitman 143. Shaft 113 is provided with a longitudinal groove 149 engaged by a key extending inwardly from pinion 150, said pinion, in operation meshing with a gear wheel 151, rotatably mounted upon a shaft 152. Secured to the gear wheel 151 and surrounding shaft 152, seen in Figs. 7 and 25 is an annular housing 153, said housing inclosing disks 154 and 155 spaced apart and carrying cams 156 therebetween which cams are pivoted, as at 157, to the inner plate and provided with arms 158, slotted as at 159, for inclosing pins 160 carried by the outer plate 155.

The circular face of each of the cams 156 lies in contact with the inner surface of housing 153, and the pins 160 extend through plate 155, whereby rotation of said plate in one direction will cause the arms 158 of said cams to swing in such manner as to cause the circular edges of said cams to tightly grip the inner surface of the housing 153, so as to cause said housing and gear wheel 151 to rotate with the disk 155. It will be observed that a reverse rotation of disk 153 will swing arms 158 in a direction for releasing the engagement of cams 156. Extending inwardly from disk 155 is a pin 161 and extending outwardly from disk 154 is a similar pin 162, the free ends of said pins lying in the same transverse vertical plane. The said ends of pins 161 and 162 are connected by a preferably coiled spring 163, whereby upon release of housing 153 by cams 156, the disk 154 will be moved to its initial position, said disk being freely rotatable within housing 153. The disk 155 is preferably formed integral with a laterally extending sleeve 164 to which is pivoted, as at 165, a pitman 166, pivotally connected at its opposite end to a yoke 167 extending upon either side of the main power shaft 16, said pitman being provided with a traveler 168 riding upon a cam 169 carried by said shaft 16. A suitable spring as 170 is connected with pitman 166 and secured to a fixed point for retracting the same after each forward stroke through the operation of cam 169.

The shaft 152 is preferably journaled at each end in a suitable bearing box 171 as seen in Figs. 2, 31 and 32, slidably mounted within a suitable way 172, and pressed from beneath by a spring 173. Each of said boxes is limited in its movement by set screw 174, and each of springs 173 has its tension controlled by a similar screw 175. It will be apparent that shaft 152 by reason of its particular mounting is capable of movement in a vertical plane, a suitable lever as 176 engaging said shaft near each end thereof, each of said levers being pivoted to a fulcrum intermediate its length and at the opposite end being pivoted to a collar 176' encircling shaft 16, said collar carrying a traveler 177' engaging a cam 177, said cams being carried by shaft 16.

Fixed to shaft 152 is a tape feed wheel 130

178 which carries a ratchet 179 designed to be engaged by a pawl 180 pivotally attached to an arm 181 extending from sleeve 182 surrounding shaft 152, and limited against lateral movement by a collar 183. A pitman as 184 has one end pivoted between lugs 185 rising from sleeve 182, and the other end formed with a yoke surrounding shaft 16 and carrying a traveler 186, engaging a cam 187, carried by said shaft 16, whereby as the shaft 16 is rotated the wheel 178 will be rotated by a step to step movement, a spring retracting pitman 184 after each stroke. The periphery of wheel 178 is preferably formed with scoring plates 188, extending transversely thereof, and spaced apart a distance equal to the circumference of a ring 26. The said wheel 178 in operation is designed to carry upon its periphery paper ribbon, or tape 189, which is delivered thereto from a framework 190, said framework being of comparatively large proportions relative to the remainder of the mechanism, and being preferably positioned at the opposite side of shaft 16 from that upon which the assembling parts thus described are positioned. A supply reel 191 is rotatably mounted in the frame 190 from which is passed a paper ribbon or tape 189$^a$, said tape being passed between a moistening roll 192 and a moistening wheel 193, carried by said framework, said wheel receiving its moisture from a box 194 and said roll receiving its moisture from an integral box 195 through a wick, it of course being understood that the tape 189$^a$ is gummed on that face which contacts with roll 192. The tape 189$^a$ is next passed about a series of pulleys 196, over a moistening wheel 197 carried by a water supply box 198 slidably mounted on the upper beam of the framework 190, said beam being provided with a longitudinal slot through which is passed a set screw 199 carried by box 198.

It will be observed that the tape 189$^a$ is moistened on both sides by roll 192 and wheel 193, the object being to prevent curling transversely. The comparatively great distance the tape 189$^a$ moves before reaching wheel 197 permits evaporation of the moisture from said tape to some extent, and hence the necessity for remoistening, the adjustment of the box 198 longitudinally of the upper beam of framework 190, being designed to facilitate the regulation of the supply of moisture according to the degree of evaporation. A second reel as 200 is carried by the framework 190 and is provided with a supply of paper tape 189$^b$ of the color which is desired to be given to the completed box. The tape 189$^b$ is passed with its colored face upward over a pasting roller 201 and is then twisted and passed over a wheel 202 carried by the framework 190 with the colored face in contact with said wheel.

The tape 189$^a$ meets the tape 189$^b$ at the point of the wheel 202 and the two tapes are caused to adhere, they together forming tape 189 which is passed over a suitable roller 203 carried by plate 73, and then downward past a moistening roll 204, through a guiding casing 205 onto the periphery of wheel 178. The moistening roll 204 is exactly like roll 192 each being provided with a wick extending into a water supply box whereby moisture is supplied through capillary attraction.

During the operation of assembling the parts of a box it is necessary to supply sections of the tape 189 equal in length to the circumference of a ring 26, and in order to supply said ribbon in such lengths a scoring wheel as 206 is carried between the arms of the bifurcated end of bolt 207, said scoring wheel being adapted at times to be moved across the tape 189 above scoring plates 188. The bolt 207 is carried by slide 208 moving horizontally between guides 209, 209, said slide being pivotally engaged by link 210' connected with lever 210 which lever is pivoted at 211' and carries a cam engaging disk 212 intermediate of its ends, said disk riding in a slot of cam 213, secured to shaft 16, said slot being of the contour for swinging said lever in timed relation to the movement of wheel 178, for causing wheel 206 to score tape 189 at the point of each of scoring plates 188.

Lugs 214 extend laterally from wheel 178 and are designed to be engaged by the inclined face 215 of a lever 216, for swinging the said wheel 178 in an opposite direction to that of its general movement, said lever being pivoted, as at 217, to plate 84, and spring pressed at its upper end, as at 218, for imparting a tendency to the lower part of the lever to swing outwardly the said inclined face 215 engaging one of lugs 214 as the plate 84 moves upwardly for swinging wheel 178 as above described, and the said lever 216 swinging outwardly as soon as released from lug 214, so that its lower end will lie in a vertical plane outside that of said lug.

Pivoted between the parts of a bracket 219 carried by the standard 112 is a lever 220, which has its lower end pivotally attached to pitman 221 and its upper end extending into the horizontal plane of plate 88' and carrying a roller 222 provided with a flange 223, and also carrying above said roller a plate or block 224 attached loosely by screws 225, and pressed laterally by a spring 226. The pitman 221 is provided with a strap 227 at the opposite end to that attached to lever 220, said strap surrounding shaft 16 and carrying a traveler 228 engaging a cam 229, secured to said shaft 16 in such position as to give a longitudinal pull to the pitman 221 in the direction of said last mentioned shaft. Any suitable spring 230 being attached to said pitman for giving the same a normal tendency to move in the opposite direction.

On the opposite side of standard 112 to that carrying bracket 219 is secured a bracket 231 seen in Fig. 3, between the arms of which is pivoted a finger 232, the upper end of which, in operation swings in the arc of a circle across the horizontal plane of plate 88 contiguous the rear end of housing 123, and the lower end of said finger 232 is pivotally attached to a pitman 233 carrying a yoke 234 extending upon each side of shaft 16 and provided with a traveler 235 riding upon a cam 236, secured to the shaft 16, any suitable spring 237 being provided for causing said traveler to remain in contact with its cam.

In the operation of the present improved mechanism, the various parts, to wit, a disk, a ring and a strip of paper tape are assembled in such manner as to produce one completed section of a box, and this assembling is accomplished through the mechanism just described, the operation being as follows: A supply of rings is placed within housing 19, the trough 95 is supplied with disks, the plunger 97 exerting pressure thereon, and the main shaft 16 is rotated, whereby by the mechanism previously described a ring is directed down the chute 49 and by means of the mechanism, shown in Figs. 14 and 15 into bore 69, the slide 72 moving upwardly at this juncture and the expanding former moving longitudinally into bore 69 within said ring and expanding sufficiently to grasp the same and withdraw it so as to be outside the plane of slide 72 by the time of its return, the said slide while at the highest point of its movement having the plate 88' carried thereby brought into register with the bore of cylinder 94 and receiving one of disks 27, the pressure of plunger 97 causing said disk to be fed into tight contact with said plate and held there until said slide starts upon its downward movement, when, through the cam mechanism hereinbefore described the pressure of said plunger is released, and the slide moves downwardly until the said plate 88' registers with the expanding former and the ring carried thereby, the fingers 90 carried by plates 84 lightly clamping the said disk for retaining the same in position. A retaining device 238, seen in Fig. 3, is pivoted, as at 239, between lugs 240, and spring pressed downwardly by spring 241 so that its under curved edge will normally lie in contact with the outer surface of ring 26 at this point of the operation, said retaining device being provided with a depending flange 242, extending beyond the forward edge of said ring 26. While the slide 72 is moving upwardly as just above described the inclined surface 215 of lever 216 engages one of the lugs 214 on wheel 178 and swings the same back as before described, said lever swinging outwardly so as to miss the lug just engaged and will contact with the next succeeding lug upon the next operation of the entire mechanism. Wheel 178 is moved at each operation a distance sufficient to cause the ends of the tape to be firmly pressed together, and in order that the tape may be scored at the proper point with the next movement of scoring disk 206, wheel 178 is moved rearwardly, as described. The tape is severed by the tension exerted thereon as the direction of rotation of wheel 178 is reversed. When the wheel 178 has been swung backwardly one of the scoring plates 188 will lie in a plane just beneath scoring disk 206. The cams 177 will next permit shaft 152 to rise until the tape 189 carried by the periphery of wheel 178 is brought into contact with the outer surface of the ring 26 held by the expanding former. The disk 206 now moves across tape 189 and scores the same to a degree sufficient to permit its ready severance as above described. The wheel 178 and the expanding former, through their respective operating mechanisms begin to rotate and continue until the said expanding former has completed one rotation, whereby the tape 189 is wrapped about the outer surface of ring 26 and about periphery of disk 27, the tape 189 being of a sufficient width to extend beyond the said disk, whereby by contact with one of the fingers 90, and the circular wall of the aperture formed in plate 84, the said tape is caused to adhere not only to the surface of the ring 26 but also to the periphery of the disk 27 and to a portion of its rear face. During the operation of winding the tape upon the assembled ring and disk the edge of such tape projecting beyond the disk will first come into contact with the lower edge of the finger shown at the left in Fig. 5, and inasmuch as this finger projects beneath the disk as shown in Fig. 23, the edge of the tape will be carried over the rear edge of the disk, as described. The retainer 238 tends to smooth the said tape as it is passed beneath the same, the roller 222 serving approximately the same function, block 224 also assisting to perfect the positioning of tape 189. The rotatable mounting of disk 87 and plate 88' carried thereby, facilitates rotation of the disk 27 contacting with said plate and prevents friction during rotation of the expanding former and parts engaged thereby. The flange 223 engages that portion of the tape 189 extending forwardly of the free edge of ring 26 and bending the same at a right angle thereto positions it for the next operation of the mechanism. It will be observed that shaft 113 is provided with a double collar 243 engaged by the bifurcated end of a lever 244, pivoted as at 130

245, and engaging at its free end a cam 246 carried by the shaft 16, the groove of cam 246 being such as to move lever 244 so as to thrust forwardly the shaft 113 for producing the operation of the expanding former as above described. The sleeve 124 is also provided with a double collar 247, engaged by the bifurcated end of a lever 248 pivoted as at 249 and having its free end engaging the groove of a cam 250, carried by shaft 16, said groove being shaped to move lever 248 so as to reciprocate sleeve 124 as will be described.

In the further operation of the mechanism the sleeve 124 moves rearwardly until the bevel 132 contacts with the bevel 127 and causes a centering of the plates of the expanding former, the roller 222 having moved out of the plane of movement of sleeve 124. The sleeve 124 continues to move until that portion extending beyond shoulder 132 strikes against the inwardly turned portion of tape 189 and causes the same to be pressed tightly against the inner surface of ring 26, the said portion of sleeve 124 extending beyond shoulder 131 surrounding the head of the expanding former and tightly engaging the ring 26. The sleeve 124 is now rotated slightly for assuring disengagement of the disk 27 from fingers 90, and the sleeve and expanding former are moved longitudinally forward together until both pass within housing 123. It is found in practice that the moisture carried by the front edge of the ring 26 will cause it to cling to the housing 123 as it is freed from sleeve 124, and hence the arrangement of finger 232, which finger at this juncture strikes the ring 26, which with the applied parts now form a completed section of box and the said section drops into a suitable chute as 251, arranged to receive the same and direct it to any desired point of delivery.

In the starting of each complete operation of the entire mechanism, a ring is directed down the chute 49 by the devices illustrated most clearly in Figs. 9 and 10, and the operation of segregating the ring contained within the housing 19 simply consists in the actuation of pinion 11 and its intermeshing gears, whereby the brushes 5, 5 are caused to swing in one direction for distributing the rings within the housing 19, while the plate 17 is rotated in an opposite direction, causing the arms 24 to engage said rings and direct the same beneath the lower edge of the housing 19 against the ring 21. The travel of the plate 17 causes the rings discharged from the housing 19 to move about the ring 21 until they arrive in contact with one of the arms 30 of wheel 29. The wheel 29 is rotated by the mechanism illustrated in Fig. 13 with a step by step movement, and discharges the rings, one at a time, between ends 22 and 23 of ring 20, the rings falling into contact with roller 42 and being directed thereby down the chute 49.

Having fully described my invention what I claim as new, and desire to secure by Letters Patent, is—

1. In a mechanism of the class described, a reciprocating slide, a rotatable member carried thereby, means for discharging disks in the path of movement of such member, said slide arranged to convey the disks to a point of assembly, means for supplying a ring to each of the disks, such rings and disks constituting box forming members, and means for applying a connecting medium to the disks and rings, such means last mentioned including a wheel carrying such connecting medium on the periphery thereof.

2. In a mechanism of the class described, a reciprocating slide, a rotatable member carried thereby, means for discharging disks in the path of movement of such member, said slide arranged to convey the disks to a point of assembly, means for supplying a ring to each of the disks, such rings and disks constituting box forming elements, and means for applying a connecting medium to the said disk and rings.

3. In a mechanism of the class described, a reciprocating slide, a rotatable member carried thereby, means for discharging disks in the path of movement of such member, disk holding devices carried by the slide, said slide arranged to convey the disks to a point of assembly, means for supplying a ring to each of the disks, such rings and disks constituting box forming elements, and means for applying a connecting medium to the said disks and rings.

4. In a mechanism of the class described, a housing for containing rings, mechanism including oppositely moving elements engaging said rings for separating the same, one of said elements being flexible, means for supplying disks, means for assembling the rings and disks, and a wheel for carrying and applying a connecting medium to such rings and disks.

5. In a mechanism of the class described, the combination with a suitable framework, of a vertical standard affixed thereto, a sleeve surrounding the same, brushes carried by said sleeve, a circular plate surrounding said sleeve beneath said brushes, means for rotating said sleeve and plate in opposite directions, a housing above said plate designed to contain a supply of rings, means for supplying disks, means for assembling the rings and disks, and means for applying a connecting medium to such rings and disks.

6. In a mechanism of the class described, the combination with a suitable framework, of a fixed standard rising vertically therefrom, a sleeve surrounding said standard, and carrying a beveled gear, a collar surrounding said sleeve above said gear and provided with a laterally projecting lug, a plate surrounding said sleeve and carrying a beveled gear wheel above said collar, a beveled gear meshing with both of said gears and having its axis journaled in the lug of said collar, means for retaining a supply of rings upon said plate, means carried by said sleeve for arranging said rings in position for discharge, means for supplying disks, means for assembling the rings and disks, and means for applying a connecting medium to such rings and disks.

7. In a mechanism of the class described, the combination with a framework of a rotatably mounted circular plate, a fixed housing spaced above the same and adapted to contain rings, a ring carried by said housing, spaced therefrom, and having its lower edge contiguous to the outer periphery of the plate, means for directing the rings contained in the housing into contact with the ring spaced from said housing, means for discharging the rings successively from the space between the housing and the ring spaced therefrom, means for supplying disks, means for assembling the rings and disks, and means for applying a connecting medium to such rings and disks.

8. In a mechanism of the class described, the combination with a suitable framework, of a housing for containing rings, a revolubly mounted disk forming the base to said housing, tangentially arranged arms secured to said housing and extending inwardly therefrom and beveled in the direction of movement of said base, brushes mounted in said housing moving in the opposite direction to that of the base, means for controlling the discharge of said rings, means for supplying disks, means for assembling the rings and disks, and means for applying a connecting medium to such rings and disks.

9. In a mechanism of the class described, the combination with a suitable framework, of a housing for containing box forming rings, an inclosing ring carried by said housing and spaced therefrom, means for directing rings from said housing into the space between the same and said inclosing ring, the said inclosing ring being broken at one point, means for discharging the box making rings through said break in the inclosing ring, means for supplying disks, means for assembling the rings and disks, and means for applying a connecting medium to such rings and disks.

10. In a mechanism of the class described, the combination with a housing for containing rings, of a pivotally mounted brush within the same, means for swinging said brush about said housing, a moving element engaging said rings for assisting the said brush in the segregation thereof, means for supplying disks, means for assembling the rings and disks, and means for applying a connecting medium to such rings and disks.

11. In a mechanism of the class described, the combination with a suitable framework, of a wheel mounted therein, a block surrounding the shaft of said wheel, a ratchet carried by said shaft, a pawl carried by said block and engaging said ratchet, a pitman pivotally engaging said block, a main shaft carrying a cam, a strap surrounding said main shaft carrying a traveler engaging said cam, means connecting said pitman to said strap, whereby a step by step movement will be imparted to said wheel upon rotation of said main shaft, means for rotatably supporting a box forming ring and disk in operative relation to said wheel, means for supplying a connecting medium, such connecting medium being applied to the box members by the rotation of the wheel.

12. In a mechanism of the class described, the combination with a housing for containing rings, of a pivotally mounted brush within the same, means for rotating said brush about said housing, an element engaging said rings and moving in an opposite direction to the movement of said brush for assisting in the segregation of said rings, means for supplying disks, means for assembling the rings and disks, and means for applying a connecting medium to such rings and disks.

13. In a mechanism of the class described, the combination with a suitable framework, of a chute arranged therein, a roller journaled transversely of the upper end of said chute, a pulley carried by one of the journals of said roller, a main power shaft, means for imparting movement from said main power shaft to said pulley, means for supplying box forming rings into contact with said roller whereby they will be directed down said chute, means for removing said rings from the base of said chute, means for supplying a disk to each of said rings and means for applying a ring and disk-connecting medium.

14. In a mechanism of the class described, the combination with a suitable framework, of a chute arranged therein having a circular aperture at its base, a standard supporting said chute and formed with a transverse bore registering the said aperture, means for supplying rings to said chute, means for obstructing their entrance into said bore, means for forcing the rings into into said bore, means for removing them therefrom, means for supplying a disk to each of said rings, and means for applying a ring and disk-connecting medium.

15. In a mechanism of the class described, the combination with a suitable framework, of a standard rising vertically therefrom, having its upper end bored transversely, a chute rising vertically from said standard and formed with a circular transverse aperture at its lower end registering with said bore, means for feeding box forming rings to said chute, means for forcing the same into said bore, means for removing them therefrom, means at the opposite end of said bore to that of the chute for supplying a disk to each of said rings, and means for applying a ring and disk connecting medium.

16. In a mechanism of the class described, the combination with a suitable framework, of a chute carried thereby, a transverse circular aperture being formed through the lower end of said chute, means for supplying rings to said chute, radially movable arms extending into said aperture for obstructing the discharge of said rings, means for moving said arms out of said aperture and discharging said rings, means for supplying a disk to each of the rings and means for applying a ring and disk-connecting medium.

17. In a mechanism of the class described, the combination with a suitable framework, of a chute carried thereby, a transverse circular aperture being formed through the lower end thereof, means for supplying rings to said chute, radially movable spring pressed arms extending into said aperture, means for moving said arms out of said aperture for permitting the discharge of said rings, means for supplying a disk to each of the rings, and means for applying a ring and disk-connecting medium, substantially as described.

18. In a mechanism of the class described, the combination with a suitable framework, of a chute carried thereby, and formed with a transverse aperture at its base, radially movable arms extending into said aperture and having their inner ends normally contacting with each other, stems carried at the outer ends of said arms, springs surrounding said stems, housings inclosing said springs each provided with a longitudinal slot, a lug carried by each of said arms engaging the slot of its respective housing, means for supplying rings to said chute, means for moving said arms out of said aperture against the pressure of said spring for permitting the discharge of said rings from said chute, means for supplying a disk to each of said rings, and means for applying a ring and disk-connecting medium, substantially as described.

19. In a mechanism of the class described, the combination with a suitable framework, of a chute carried thereby, and formed with a transverse aperture at its base, radially movable arms extending into said aperture and having their inner ends beveled forwardly, a plunger in the rear of said chute, means for supplying rings to said chute, means for moving said plunger into said aperture for directing one of said rings out of said aperture, means for supplying a disk to said ring, and means for applying a ring and disk-connecting medium, substantially as described.

20. In a mechanism of the class described, the combination with a suitable framework, formed with a transverse aperture, radially movable arms extending into said aperture, means for supplying rings to said chute, said radial arms being beveled forwardly at their inner ends, a conical plunger arranged in the rear of said aperture and provided with a ring carrying means, means for swinging said plunger into said aperture for moving said arms out of the same, and for discharging one of said rings therefrom, means for supplying a disk to each of said rings and means for applying a ring and disk-connecting medium.

21. In a mechanism of the class described, the combination with a suitable framework, of a chute arranged therein and provided with a transverse aperture, radial arms extending into the same, a plunger arranged in the rear of said aperture, formed of a cylindrical body tapered to a point at its front end, and provided with an annular shoulder near the beginning of the taper, means for moving said plunger into said aperture, means for supplying rings to said chute, whereby each time the plunger is moved into said aperture a ring will mount upon said plunger in contact with the shoulder thereof, the tapered portion of the plunger directing the inner ends of said radial arms over said ring whereby the ring will be discharged from said aperture, means for supplying a disk to said ring, and means for applying a ring and disk-connecting medium, substantially as described.

22. In a mechanism of the class described, the combination with a suitable framework, of a chute arranged therein and provided with a transverse aperture, radial arms extending into the same, a plunger arranged in the rear of said aperture formed of a cylindrical body tapered toward the front, provided with an annular shoulder and formed with longitudinal grooves corresponding in number and plane to the radial arm, means for moving said plunger into said aperture means for conveying the rings to a point of assembly, means for supplying rings to said chute, means for supplying a disk to each of said rings, and means for applying a ring and disk-connecting medium, substantially as described.

23. In a mechanism of the class described, the combination with a suitable framework, of a chute arranged therein and provided with a transverse circular aperture, means for supplying rings to said chute, radial arms extending into said aperture and having their inner ends beveled forwardly, a ring carrying plunger arranged in the rear of said aperture and having its front end tapered to conical form, means for moving said plunger into said aperture, so as to bring the conical portion thereof into contact with the beveled ends of said arms for moving the same out of said aperture, whereby one of said rings may be discharged from the aperture, means for supplying a disk to said ring, and means for applying a ring and disk-connecting medium, substantially as described.

24. In a mechanism of the class described, the combination with ring segregating means, of a chute, a roller having its periphery extending into the chute and designed to engage and direct the rings from said segregating means down the chute, means for conveying the rings to a point of assembly, means for supplying a disk to each of the rings, and means for applying a connecting medium to the assembled rings and disks.

25. In a mechanism of the class described, the combination with a suitable framework, of a disk carrying trough arranged therein, a plunger pressing the supply of disks carried thereby, means for separating the said disks one at a time from the supply, means for carrying the disks to a place of assembly, means for releasing the pressure of said plunger at each separation and permitting its exertion before the next succeeding separation, means for supplying rings to said disks, and means for applying a ring and disk-connecting medium, substantially as described.

26. In a mechanism of the class described, the combination with a suitable framework, of a disk carrying trough arranged therein, a plunger in said trough normally pressing the supply of disks within the same, a rod extending from said plunger, a weight connected with the plunger for normally compressing the supply of disks within the trough, a collar surrounding the plunger rod, means carried thereby for engaging the same at times, means for removing disks from said trough successively, means for carrying the disks to a place of assembly, means for moving said collar with its engaging means locked against said plunger rod in an opposite direction to that of the direction of said plunger for releasing the pressure of the plunger in timed relation to the removal of said disks, for supplying rings to said disks, and means for applying a ring and disk-connecting medium.

27. In a mechanism of the class described, the combination with a suitable framework, of a disk carrying trough arranged therein, a plunger arranged in said trough and normally pressing said disks, a weight connected with said plunger for moving the same in the direction of the discharge of said disks, a plunger rod extending from said plunger, a sleeve surrounding said rod, means carried by said sleeve for locking it against longitudinal movement with respect to said rod, a shaft spaced from said plunger rod, a sleeve surrounding said shaft and slidable thereon, a web connecting said last mentioned sleeve with said first mentioned sleeve, a main shaft, means for communicating motion from said main shaft to said last mentioned sleeve for moving said first mentioned sleeve together with the plunger rod and plunger for releasing the pressure of said plunger at times, means for removing the disks from said trough successively, means for carrying the disks to a place of assembly, means for supplying a ring to each of said disks, and means for applying a ring and disk-connecting medium, substantially as described.

28. In a mechanism of the class described, the combination with a suitable framework, of a disk carrying trough arranged therein, a plunger within said trough in contact with the supply of disks carried thereby, a main shaft, means controlled thereby for releasing the pressure of said plunger, means operated by said shaft for removing the disks from said trough one at a time, means for carrying the disks to a place of assembly in timed relation to the release of the plunger, means for supplying a ring to each of said disks, and means for applying a ring and disk-connecting medium, substantially as described.

29. In a mechanism of the class described, the combination with a suitable standard, of uprights carried thereby, and formed with longitudinal grooves, a slide moving in said groove, having means for holding a disk including disk clamping fingers, means for supplying disks to said holding means, means for moving the slide to bring the holding means to a point of assembly, means for supplying a ring to each of said disks, and means for applying a ring and disk-connecting medium, substantially as described.

30. In a mechanism of the class described, a disk carrying member provided with an aperture, a rotatable member mounted within the aperture, means for supplying disks to the face of the rotatable member when the carrying member is in a given position, and fingers mounted on the carrying member and arranged to engage the edges of the disks, and hold them against the rotatable member, means for moving the said carrying member to bring the disks to a point of assembly, means for supplying a ring to each of the disks, and means for applying a connecting medium to the rings and disks.

31. In a mechanism of the class described, a disk carrying member provided with an aperture, a rotatable member mounted within the aperture, means for supplying disks to the face of the rotatable member when the carrying member is in a given position, spring pressed pivoted fingers each provided with a segmental portion mounted on the carrying member and arranged to engage the edges of the disks, and hold them against the rotatable member, means for moving the said carrying member to bring the disks to a point of assembly, means for supplying a ring to each of the disks, and means for applying a connecting medium to the rings and disks.

32. In a mechanism of the class described, the combination with a suitable framework, of a slide mounted therein, a front plate carried thereby formed with an aperture, a plate revolubly mounted in said aperture, means for supplying a disk in contact with said revolubly mounted plate, means for reciprocating the slide for bringing the aperture therein alternately to a point of disk supply and a point of assembly, means for bringing a ring into contact with said disk, means for rotating said disk and ring, and means for applying a securing medium thereto during rotation, substantially as described.

33. In a mechanism of the class described, the combination with a suitable framework, of a slide mounted therein, a front plate carried by said slide and formed with an aperture, a circular plate revolubly carried by said slide within the aperture of said front plate, clamping fingers carried by said front plate upon either side of said circular plate, means for supplying a disk to said fingers in contact with said circular plate, means for reciprocating the slide for bringing the aperture therein alternately to a point of disk supply and a point of assembly, means for applying a ring to the said disk, means for rotating the said ring and disk, and means for applying a connecting medium to said parts as they are rotated, substantially as described 34. In a mechanism of the class described, the combination with a suitable framework, of a slide mounted therein, a front plate carried by said slide and formed with a circular aperture, a race being formed in said slide and provided with anti-friction means, a circular plate rotatably connected to said slide and bearing on said anti-friction means and extending into the aperture of said front plate, spring pressed clamping fingers carried by said front plate, means for supplying a disk to said fingers in contact with said circular plate, means for reciprocating the slide for bringing the aperture therein alternately to a point of disk supply and a point of assembly, means for supplying a ring in contact with the said disk, and means for applying a connecting medium for securing said disk and ring together, substantially as described.

35. In a mechanism of the class described, the combination with a suitable framework, of a slide mounted therein, disk carrying means secured to said slide, means for supplying a disk to said slide at one plane, means for supplying a ring in contact with said disk at another plane, means for moving said slide in timed relation to the movement of the said supplying means, and means for applying a connecting medium for securing said disk and ring together, substantially as described.

36. In a mechanism of the class described, the combination with a suitable framework, of a slide mounted therein, means for moving said slide vertically, means for supplying a disk to said slide when in its highest horizontal plane, means for passing a ring beneath said slide while in said plane, means for moving said slide to its lowest horizontal plane in timed relation to the movement of the ring controlling means, and means for applying a connecting medium for securing said ring and disk together, substantially as described.

37. In a mechanism of the class described, the combination with a suitable framework, of a standard rising therefrom and provided with a transverse bore, means for supplying rings to said bore, a shaft longitudinally slidable within said framework, an expanding former carried by said shaft, means for moving said shaft for directing said former within said bore for removing a ring therefrom, means for supplying a disk to each ring and means for applying a connecting medium to said disk and ring.

38. In a mechanism of the class described, the combination with a suitable framework, of a standard rising therefrom and provided with a transverse bore, an expanding former mounted in said framework, means for supplying rings to said bore, means for moving said former into said bore and into one of said rings for removing the same from said bore, means for holding a disk in contact with said ring while carried by said former, means for rotating said former together with said ring and disk, and means for applying a tape to said ring and disk during such rotation whereby the same are secured together, substantially as described.

39. In a mechanism of the class described, the combination with a suitable framework, of a standard formed with a transverse bore, means for supplying rings to said bore, a slide moving in front of said bore, an expanding former in front of said slide, means for moving said slide upwardly and said expanding former within said bore simultaneously, means for supplying a disk to said slide while in its raised position, said former engaging a ring while within the bore, mechanism for returning the parts to their normal position whereby the said ring and disk will be brought into contact with each other, and means for applying a connecting medium for securing the same together, substantially as described.

40. In a mechanism of the class described, the combination with a suitable framework, of a wheel mounted therein, means for supplying box forming rings and disks thereto, means for supplying a connecting medium, said wheel arranged to apply such medium to the rings and disks, a block carried by the shaft of said wheel, a ratchet supported by said shaft, a pawl carried by said block and engaging said ratchet, a pitman engaging said block, and means for reciprocating said pitman.

41. In a mechanism of the class described, the combination with a suitable framework, of an expanding former mounted therein, such former comprising a plurality of segmental plates forming a circular head, and springs pressing said plates radially, a shaft carrying the free ends of said springs, means for moving said former within a box forming ring, means for supplying a disk to said ring, and means for applying a connecting medium for securing said parts together while in contact with said former, substantially as described.

42. In a mechanism of the class described, the combination with a suitable framework, of a longitudinally movable shaft mounted therein, an expanding former carried thereby, means for moving said shaft longitudinally, means for rotating said shaft, a sleeve slidably surrounding said shaft, means for rotating said sleeve, means for moving the same longitudinally independently of said shaft, means for supplying a ring and a disk to said expanding former for being secured together, substantially as described.

43. In a mechanism of the class described, the combination with a suitable framework, of an expanding former, means for supplying a ring and a disk thereto, means for wrapping the said ring and disk with a tape, means for bending the outer overlapping edge of the tape across the front edge of said ring, and means for contracting said former and pressing said overlapping edge of the tape against the inner surface of said ring, substantially as described.

44. In a mechanism of the class described, the combination with a suitable framework, of an expanding former mounted therein, means for supplying a ring and a disk thereto, means for wrapping the same with tape, means for rubbing the said tape smooth, a flanged wheel engaging said tape for directing its overlapping outer edge across the front edge of said ring, a sleeve surrounding said former, and means for moving said sleeve within said ring, substantially as described.

45. In a mechanism of the class described, the combination with a suitable framework, of an expanding former mounted therein, and having an annular beveled portion, means for supplying a ring and a disk to said former, means for wrapping the same with tape while in contact with said former, a sleeve surrounding said former and provided with a beveled portion designed to engage the bevel of the former for contracting the same, and means moving said sleeve within the said ring, substantially as described.

46. In a mechanism of the class described, the combination with a suitable framework, of a former mounted therein, means for supplying a ring and a disk thereto, means for wrapping said ring and disk with a tape, a sleeve surrounding said former, means for moving said sleeve within said ring after the application of the tape, means for revolving said sleeve, means for retracting said sleeve, until its end passes within its support, and a finger pivotally mounted and moving in timed relation to the movement of said sleeve for striking said ring, for preventing adhesion to the support of said sleeve, substantially as described.

47. In a mechanism of the class described, the combination with a suitable framework, of a spring pressed shaft mounted therein, a main power shaft, cams carried by said main power shaft, straps surrounding said main shaft and provided with travelers engaging said cams, levers connected with said straps and having their free ends engaging said spring pressed shaft for normally pressing the same downwardly against the pressure of the springs, the structure of said cams being such as to permit said spring pressed shaft to rise at times, a wheel carried by said shaft adapted to carry a tape, and means for assembling the parts of a box above said wheel in timed relation to the movement of the shaft carrying said wheel, substantially as described.

48. In a mechanism of the class described, the combination with a suitable framework, of a disk carrying trough arranged therein, a plunger within said trough, means normally pressing said plunger longitudinally of the trough, in contact with the supply of disks carried by the trough, means for removing said disks from said trough one at a time, said means last mentioned including a slide reciprocating at right angles with the trough and provided with a transverse aperture arranged to be brought in a line with the trough and receive disks therefrom and means for releasing the pressure upon the disks during each removal.

49. In a mechanism of the class described, the combination with a frame work, of means for bringing the parts of a box into juxtaposition, a wheel mounted beneath the point of assembly and carrying a tape for securing the parts of said box together during the rotation of the wheel, cushion supports for said wheel imparting a normal lifting tendency thereto, and means for permitting the wheel to rise in timed relation to the assembly of the parts of the box.

50. In a mechanism of the class described, the combination with a frame work, of means for bringing the parts of a box into juxtaposition, a wheel mounted beneath the point of assembly and carrying a tape for securing the parts of said box together during the rotation of the wheel, a shaft supporting said wheel, springs carrying the bearings of said shaft, a lever engaging the shaft for normally retaining the same in a lowered position, and means for releasing the shaft by movement of said lever in timed relation to the assembly of the parts of the box.

In testimony whereof I hereunto affix my signature, in presence of two witnesses.

BURL H. SMITH.

Witnesses:
  GEO. WATT,
  A. J. CAVANAUGH.